United States Patent [19]
Sommermeyer et al.

[11] Patent Number: 6,010,287
[45] Date of Patent: *Jan. 4, 2000

[54] SPORT BAR SYSTEM

[75] Inventors: Kurt M. Sommermeyer, Fort Collins; James Rase, Loveland, both of Colo.

[73] Assignee: Spectrum Innovations, LLC., Loveland, Colo.

[ * ] Notice: Under 35 U.S.C. 154(b), the term of this patent shall be extended for 39 days.

[21] Appl. No.: 08/640,236

[22] Filed: Apr. 30, 1996

[51] Int. Cl.[7] ..................................................... B60P 7/08
[52] U.S. Cl. ........................ 410/144; 410/143; 410/145; 410/149; 410/104
[58] Field of Search .................................... 410/143, 144, 410/145, 149, 150, 104, 146, 148; 211/105.1, 105.3, 105.5, 105.6; 224/403, 405; 248/354.1, 200.1; 296/40

[56] References Cited

U.S. PATENT DOCUMENTS

| | | | |
|---|---|---|---|
| 2,468,101 | 4/1949 | Nampa | 410/150 |
| 3,912,139 | 10/1975 | Bowman . | |
| 3,972,500 | 8/1976 | Johnson et al. | 410/104 X |
| 4,111,449 | 9/1978 | Hancock . | |
| 4,121,849 | 10/1978 | Christopher | 410/150 X |
| 4,464,089 | 8/1984 | Allen | 410/143 X |
| 4,650,383 | 3/1987 | Hoff | 410/149 |
| 4,770,579 | 9/1988 | Aksamit | 410/150 |
| 4,921,152 | 5/1990 | Kemming . | |
| 4,934,572 | 6/1990 | Bowman . | |
| 5,092,504 | 3/1992 | Hannes | 410/151 X |
| 5,127,564 | 7/1992 | Romero . | |
| 5,409,335 | 4/1995 | Beck | 410/104 X |
| 5,427,487 | 6/1995 | Brosfske | 410/150 X |
| 5,443,586 | 8/1995 | Cargill | 410/143 |

*Primary Examiner*—Stephen T. Gordon
*Attorney, Agent, or Firm*—Dean P. Edmundson

[57] ABSTRACT

A bar system for attachment to the box of a pickup truck for securing various items in the box in a stabilized manner. The bar system includes (a) an elongated bar which includes an elongated slot, (b) mounting brackets secured to opposite ends of the bar, with at least one of the brackets being adjustably mounted, and including a bolt for securing each bracket to the box; and (c) at least one tie-down bracket carried by the bar and being movable along the bar. The bar system strengthens the box and also provides convenient and safe tie-down locations to secure and stabilize items carried in the box.

10 Claims, 4 Drawing Sheets

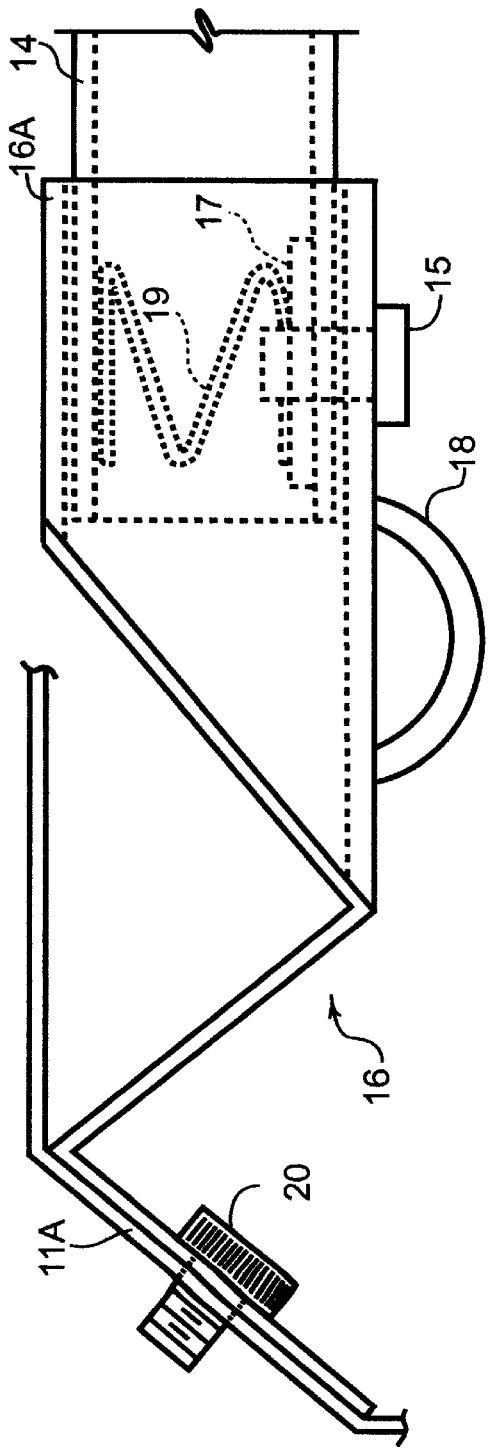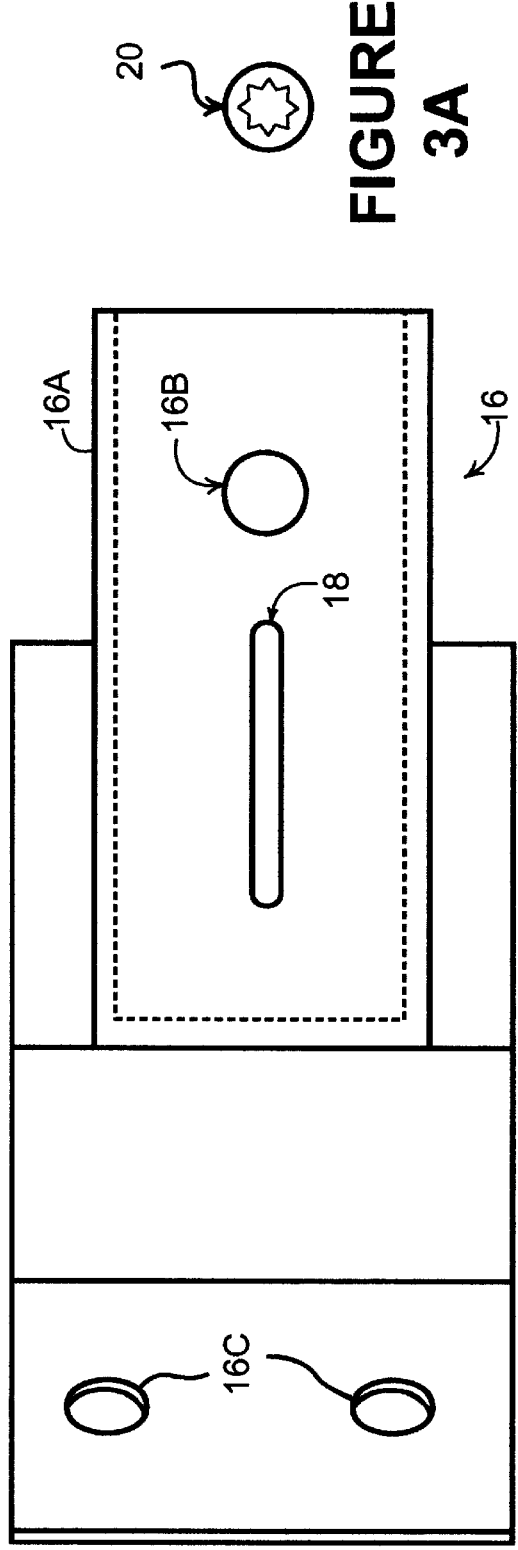

SPORT BAR SYSTEM

FIELD OF THE INVENTION

This invention relates to devices and equipment for securing cargo in the box of a pickup truck. More particularly, this invention relates to a bar system for mounting in a pickup box for securing items such as motorcycles, watercraft, etc.

BACKGROUND OF THE INVENTION

The increasing use of recreational vehicles (e.g., motorcycles, bicycles, and personal water craft) associated with sporting events and vacation activities has created a need for the development of a security oriented carrying device. Presently, with the increase in popularity of pickup trucks and the convenience and efficiency associated with transporting more than one recreational vehicle at a time, there has emerged a need for a multi-purpose stabilizing or stiffening bar with which to securely attach various items in the box of vehicles.

Although cargo stabilizing devices have been previously proposed, none of such devices has been entirely suitable for securing motorcycles, personal watercraft, etc. For example, in U.S. Pat. No. 4,650,383 there is described a cargo stabilizer which requires two guide rails attached lengthwise along opposite sidewalls of a vehicle bed. A crossbar is supported between the guide rails and can be moved forwardly or rearwardly along the rails. This type of stabilizer offers limited ability for multiple attachments. Further, the stabilizer would not be suitable for securing recreational vehicles with ropes, chains or straps. Also, the strength of the stabilizer does not appear to be adequate for certain recreational vehicles such as motorcycles or personal watercraft. The complexity of the attachment of the stabilizer to the vehicle box likely would require professional installation.

U.S. Pat. No. 3,912,139 describes a cycle carrier for mounting in the bed of a pickup. The carrier includes channel-shaped members for receiving the wheels of a motorcycle. This system would be difficult for one person to install. Also, the elevated attachment raises the center of gravity of the load, thereby resulting in unstable loads. Further, this is a single-purpose device which can interfere with other desired uses for the pickup bed. This device does not include or allow for inclusion of theft deterrent system.

U.S. Pat. No. 4,921,152 describes a combination storage container and motorcycle holder for use in a pickup truck. This system is limited to a single recreational usage (i.e., a motorcycle), and it does not allow for easy attachment of tie-down straps to secure the motorcycle. Also, the security pin is located inside the tool box and therefore is difficult to reach.

U.S. Pat. No. 5,127,564 describes a bicycle holder for a pickup truck. The holder is clamped at each end to the bed flanges of the truck box. A support tube is pivotally mounted to the middle portion of the base, and a bike holder assembly is attached to the support tube. This device is limited to attachment of bicycles only. Because the bar is easily removable from the vehicle, there is no theft deterrent aspect to it. Also, this device is limited to certain cycle handlebar configurations.

U.S. Pat. No. 4,934,572 describes a clamping apparatus for securing a bicycle to the rail of a pickup truck bed. This design is limited to attachment of bicycles only. The device does not provide any reinforcement or stiffening of the truck box.

U.S. Pat. No. 4,111,449 describes a bumper hitch for towing motorcycles. This device is not useful for securing items in the bed of a pickup truck.

U.S. Pat. No. 5,092,504 describes a bicycle rack for a pickup truck. Mounting brackets are included for bicycles and detached front wheels. This is a single-use device and does not include means for securing the bar to prevent loosening or theft. This device would not be suitable for securing large heavy recreational vehicles in the pickup box.

There has not heretofore been provided suitable apparatus for securing various recreational or sports vehicles in the bed of a pickup truck.

SUMMARY OF THE PRESENT INVENTION

In accordance with the present invention there is provided a multi-purpose support system for attachment to the box or cargo compartment of a pickup truck for securing various items in the box in a stabilized manner. The support system comprises:

(a) an elongated bar member having first and second ends and further including an elongated slot extending therealong;

(b) first and second mounting brackets secured to the first and second ends, respectively, of the bar member; wherein at least one of the mounting brackets is adjustably mounted on the bar member; wherein each mounting bracket includes one or more bolts for securing the mounting brackets to the box; and (c) at least one tie-down bracket carried by the bar member; wherein the tie-down bracket is mounted in the slot and is movable along the bar member and can be secured at any point in the slot.

The bar system allows the user to secure various items in the vehicle. Specialized attachments such as a motorcycle wheel chock, bicycle clamp, personal water craft anchor, spare tire holder, etc. are available. The support system also may easily include a theft deterrent cable to help secure items to the vehicle. The support system comprises two attachment or mounting brackets for each specific vehicle box and one main crossbar. Once the bar is attached in the vehicle it can accommodate specialized tie-down attachments for specific uses. Also, by securing the system with special hardware and using a security cable, items can be locked to the bar system.

Another very desirable aspect of the bar system of this invention is that it significantly increases the strength and rigidity of the pickup box in which it is mounted. The bar system itself has great strength, and when it is secured across the front wall of the pickup box, the bar system provides significant reinforcement to the box. Furthermore, the bar system protects the front wall of the box from damage.

BRIEF DESCRIPTION OF THE DRAWINGS

The invention is described in more detail hereinafter with reference to the accompanying drawings, wherein like reference characters refer to the same parts throughout the several views and in which:

FIG. 3 is a top plan view of one embodiment of mounting bracket useful in this invention;

FIG. 3A is an elongated view of one type of bolt which is useful in securing the bracket to the pickup box;

FIG. 4 is an elevational view of the mounting bracket shown in FIG. 3;

DETAILED DESCRIPTION OF THE INVENTION

Figure 1:
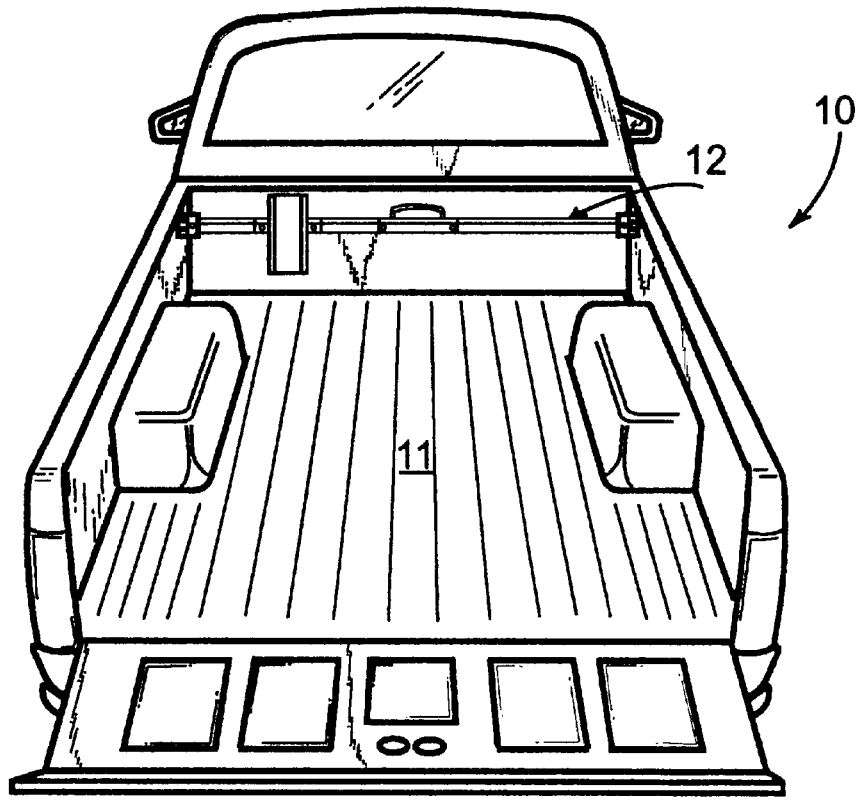
FIG. 1 is a rear perspective view of a pickup truck in which one embodiment of sport bar system of the invention has been mounted in the front of the box.

In FIG. 1 there is shown a pickup truck 10 having a box 11 for hauling cargo. At the front of the box a sport bar system 12 of the invention has been mounted. The sport bar system is secured at each end to the front corners of the box, and one or more tie-down brackets is attached to the bar.

Figure 2:
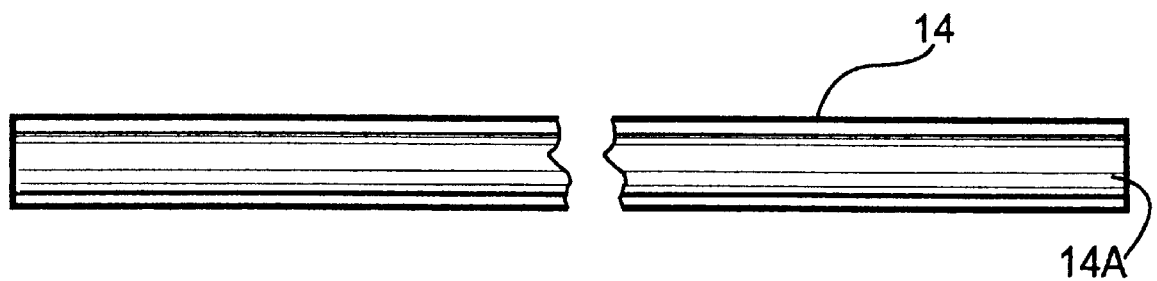
FIG. 2 is a rear elevational view of a preferred embodiment of elongated bar member which is useful in the system of this invention.

FIG. 2 is a rear elevational view of a preferred embodiment of bar member 14 useful in this invention. The bar shown is a unistrut, a tubular member which includes an elongated slot 14A along its full length. The height and depth of the bar may vary, for example, from about 1.5 to 2 inches.

FIGS. 3 and 4 show one embodiment of mounting bracket 16 which is especially useful in supporting the elongated bar member. One end of the mounting bracket includes a tubular member 16A which slides over one end of the bar member 14 where it is secured by means of a threaded bolt 15 which passes through an opening 16B in the side wall of the bracket and threadably engages a plate member 17 carried inside the tubular bar member. Spring 19 in bar 14 biases the plate 17 against the front of the bar 14.

The bracket 16 preferably includes a ring or eye 18 secured thereto which serves as a tie-down or attachment device for a rope, a strap or chain which may be used for securing items in the box of the truck. The opposite end of the bracket 16 includes openings 16C for receiving bolts 20 for securely attaching the bracket 16 to the front corner 11A of the truck box. Preferably the bolts 20 have a "Torx" head (shown in FIG. 3A). This type of bolt head cannot be loosened with a conventional wrench or screwdriver. This feature provides very good anti-theft protection for the bar system, and this feature is unique for systems of this type.

Other types of mounting brackets can be used to support the bar member and secure it to the front of a pickup box. The shape and style of the mounting bracket may vary, depending upon the geometry of the box to which it is to be secured.

Because the bar member 14 includes an elongated slot along its rear face, the mounting bracket 16 (at each end of the bar 14) can be moved laterally as needed to adjust for the exact width of the truck box. Infinite lateral adjustment is possible.

Figure 5:
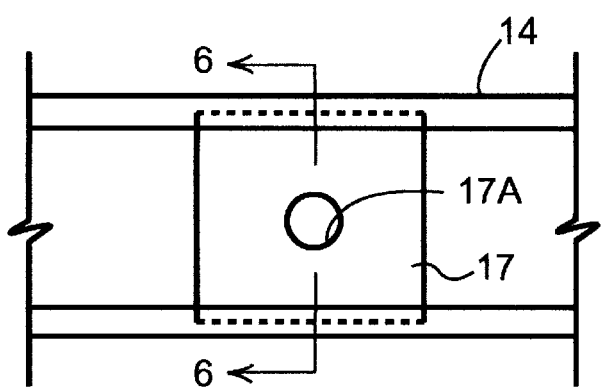
FIG. 5 is a rear elevational view of a portion of the bar member with a movable plate therein.
Figure 6:
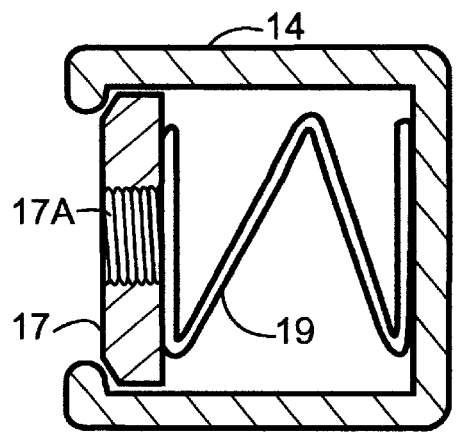
FIG. 6 is a cross-sectional view of the bar and plate shown in FIG. 5.

As shown in FIGS. 5 and 6, there are one or more plate members 17 retained within the tubular bar member 14. Each plate member has a height which is slightly greater than the height of the elongated slot in bar member 14 but less than the inside diameter of the bar member. A spring 19 biases the plate toward the open slot in the bar member. The plate includes a threaded aperture 17A for receiving a bolt.

Each such plate 17 can be moved laterally along the bar to any desired position. Then an attachment device of any desired shape or style can be secured to the bar 14 by one or more bolts which are threaded into one or more plates 17. When the bolts are tightened, the attachment device is very securely held in place on the bar.

Figure 7:
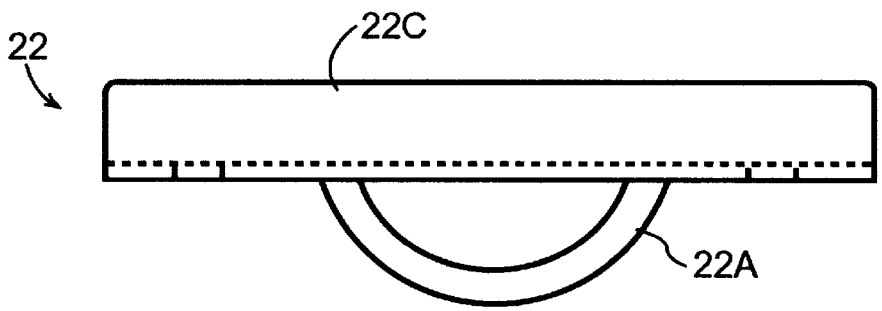
FIG. 7 is a top view of one embodiment of the tie-down attachment bracket which can be attached to and supported by the bar member.
Figure 8:
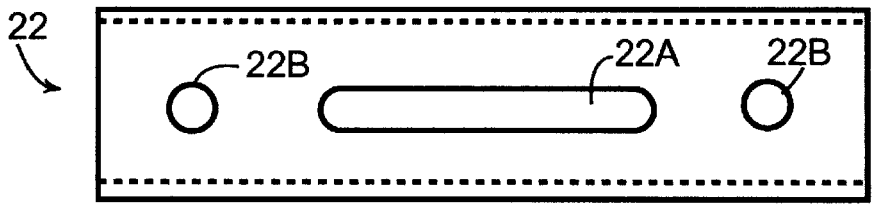
FIG. 8 is an elevational view of the bracket shown in FIG. 7.
Figure 9:
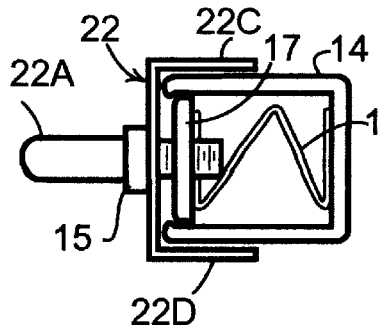
FIG. 9 is an end view of the bar member to which the bracket of FIG. 7 has been secured.

FIGS. 7 and 8 show one embodiment of attachment device 22 which includes a ring or eyelet 22A and apertures 22B. FIG. 9 shows the attachment device secured to the bar 14 by means of bolts 15. Flanges 22C and 22D on the top and bottom of the device provide additional rigidity to this attachment device.

Figure 10:
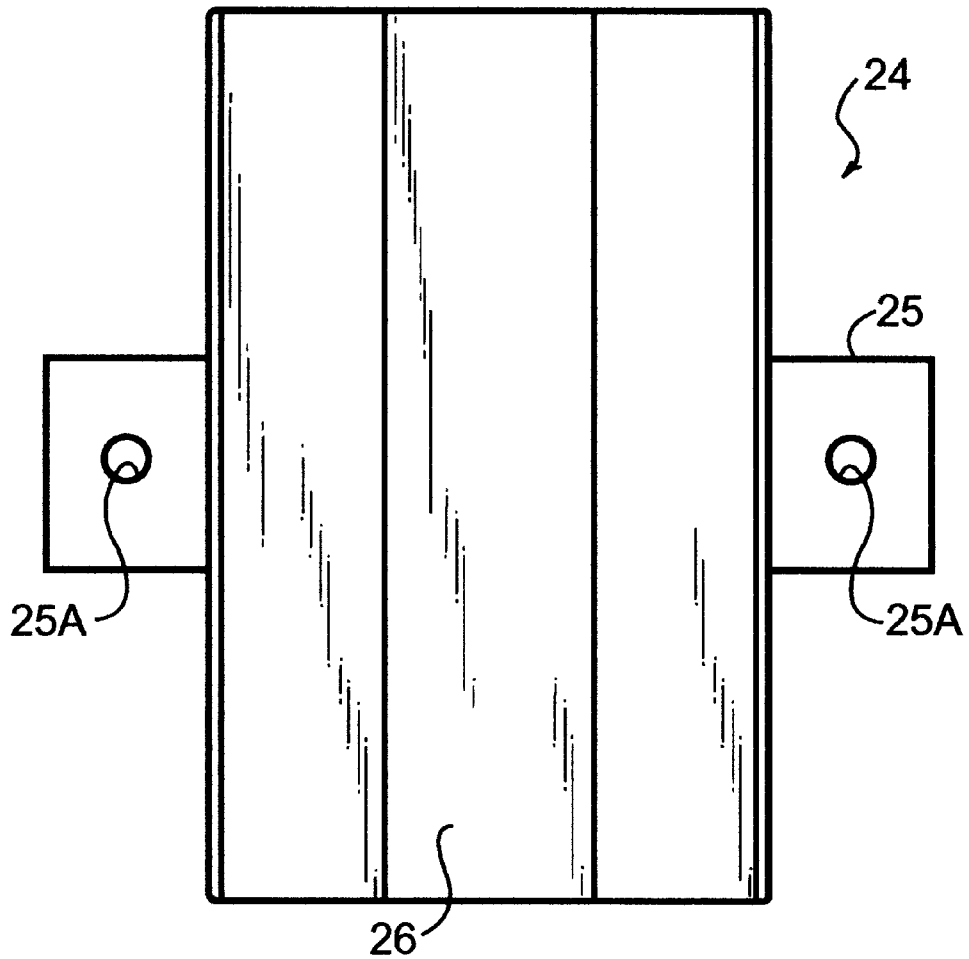
FIG. 10 is an elevational view of another embodiment of tie-down bracket useful in the system of the invention.
Figure 11:
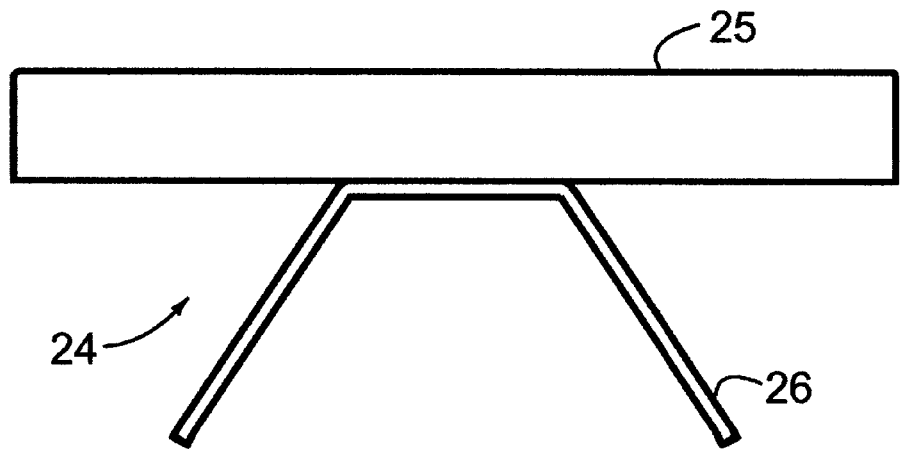
FIG. 11 is a top view of the bracket of FIG. 10.

FIGS. 10 and 11 show another embodiment of attachment device 24 which includes a horizontal bar 25 and a vertical channel member 26. This device can be secured to bar member 14 by bolts passing through openings 25A and then into appropriately positioned plates 17 in bar 14. This attachment device is useful for stabilizing and securing a bicycle or motorcycle in the bed of a truck.

Other types of tie-down or attachment brackets may also be used. Also, several of such brackets may be secured to the bar 14 at one time, if desired. Because of the elongated slot in bar 14, the brackets can be easily moved laterally to any desired spot and then secured to the bar.

What is claimed is:

1. A sport bar system in combination with the box of a pickup truck having a front wall and opposing side walls which form front corners of said box, said bar system comprising:

(a) an elongated bar member having first and second ends and further including an elongated slot extending therealong:

(b) first and second mounting brackets secured to said first and second ends, respectively, of said bar member; wherein each said mounting bracket includes a bolt for securing said mounting bracket to a respective front corner of said box;

(c) at least one tie-down bracket carried by said bar member;

wherein said at least one tie-down bracket is mounted in said slot and is movable along said bar member and can be secured at any point in said slot.

2. A bar system in accordance with claim 1, wherein said slot extends along the full length of said bar member.

3. A bar system in accordance with claim 1, wherein each of said mounting brackets slidably engages said bar member.

4. A bar system in accordance with claim 3, wherein each said mounting bracket includes an end which is slidably received over a respective end of said bar member.

5. A bar system in accordance with claim 1, wherein said bar member includes front and rear faces; wherein said rear face includes said elongated slot.

6. A bar system in accordance with claim 1, wherein said at least one tie-down bracket includes a U-shaped stirrup.

7. A bar system in accordance with claim 1, wherein said at least one tie-down bracket further includes a base which is secured to said bar member by means of a bolt and a plate carried within said bar member.

8. A bar system in accordance with claim 7, further comprising spring means in said bar member urging said plate against said slot.

9. A bar system in accordance with claim 1, wherein each said mounting bracket is bolted to said box.

10. A combination comprising:
(a) a pickup truck box including a front wall and opposing side walls which form front corners of said box;
(b) an elongated bar member having first and second ends and further including an elongated slot extending therealong; wherein each said end of said bar member is securely attached to a respective front corner of said box; and
(c) a tie-down bracket carried by said bar member; wherein said tie-down bracket is mounted in said slot and is movable along said bar member and can be secured at any point in said slot;

wherein said bar member extends transversely across the front wall of said box between said front corners to increase the rigidity of said box.

* * * * *